United States Patent [19]
Danielsen

[11] 3,936,608
[45] Feb. 3, 1976

[54] MULTIMETERING FOR TELEPHONE SWITCHING SYSTEMS

[75] Inventor: Ole Svein Danielsen, Oslo, Norway

[73] Assignee: International Standard Electric Corporation, New York, N.Y.

[22] Filed: July 26, 1974

[21] Appl. No.: 492,048

[52] U.S. Cl. .............................. 179/7.1 R; 179/7 R
[51] Int. Cl.² ........................................ H04M 15/12
[58] Field of Search ........... 179/7 R, 7.1 R, 7 MM, 179/7.1 TP, 8 R, 8 A, 9

[56] References Cited
UNITED STATES PATENTS
2,960,637  11/1960  Lüscher ............................ 179/7 R
3,097,266  7/1963  Lüscher ............................ 179/7 R FOREIGN PATENTS OR APPLICATIONS
1,024,148  3/1966  United Kingdom ............. 179/7.1 R
975,997  11/1964  United Kingdom ............. 179/7.1 R Primary Examiner—Kathleen H. Claffy
Assistant Examiner—Gerald L. Brigance
Attorney, Agent, or Firm—James B. Raden; Delbert P. Warner

[57] ABSTRACT

This invention relates to a method and means to provide local call multimetering in existing telephone systems with a minimum of changes in existing exchanges. It comprises sensing whether a call duration counter is connected to a cord circuit or not, and employs the result of this sensing operation to control an inhibiting circuit which, respectively, passes or stops the local metering pulses on their way to the subscriber's call counter. Sensing imposes a low power demand, thus sensing of the potential is sufficient. The principle may be used for toll multimetering. The first multimetering pulse will be suppressed.

7 Claims, 3 Drawing Figures

MULTIMETERING FOR TELEPHONE SWITCHING SYSTEMS

BACKGROUND OF THE INVENTION

1. Field of the Invention

This invention relates to a multimetering method and means easily adaptable to existing telecommunication switching systems in which the establishment of a connection between a calling subscriber station A and a called subscriber station B is effected at least partly via a cord circuit, and in which the calling subscriber station A is allocated a call duration counter which is arranged to be stepped forward by periodic metering signals generated by a metering signal generator.

2. Description of the Prior Art

There are a number of known different types of multimetering equipment. Included in this known equipment are multimetering processes which have been triggered by mechanical means such as a clock. Such clock may operate a cam disc and thus provide pulses with the desired pulse duration and pulse interval.

Two general schemes for using metering pulses exist. The more straight forward of these involves the provision of an individual clock pulse source for each subscriber. This solution is very expensive as the number of clockpulse generators has to be very large, but it offers the advantage that the first metering pulse will then occur instantaneously and be usable. A different solution is to use a common clock pulse generator for all the subscribers connected to a single exchange, in connection with means enabling suppression of the first of the metering pulses which is apt to be incomplete and therefore the cause of a faulty count. The result is that the metering operation does not start until the second metering pulse appears (the first one which is not suppressed). With this second solution, an inexpensive exchange is obtained as only one clock pulse generator is required.

Recently a demand has arisen for multimetering also of local calls at the most busy time of the day. This demand is based on the desire to obtain a more economical use of the rather expensive telecommunication network and to obtain a more even distribution of the telecommunication traffic.

Toll metering has been employed in telecommunication networks from the beginning and therefore is designed into the exchanges and represents an integrated part of the exchanges. Local metering equipment, however, has to be developed so that it can be adapted to existing telecommunication systems in an easy and effective manner.

SUMMARY OF THE INVENTION

An object of this invention, therefore, is to provide a metering system which is easy to produce, which is adaptable to existing exchanges without heavy expenditures, and in which in a simple manner it is possible to change the pulse interval and thereby the tariff.

A main feature of the invention is that metering signals which are common for all subscribers are led continuously to an inhibiting circuit which, in dependence on whether the call duration counter is connected to the cord circuit or not, respectively feeds the metering signals further towards the call duration counter or inhibits transfer of the signals.

A second feature is that the method is used for local multimetering and that the feeding of the call duration counter with metering signals representing the local multimetering also is inhibited if toll multimetering signals are applied, the toll multimetering signals being bypassed directly to the A subscriber's counter.

A further feature is that the first local multimetering pulse is suppressed by leading the output from the inhibiting circuit to a resetable one-step shift register, and that each toll multimetering pulse when present, resets this shift register.

Still a further feature of this invention is that the same multimetering circuit is used for different categories of calls, as, e.g., for local calls and toll calls by changing the frequency of the metering signal.

The invention relates particularly to a method and means to provide local call multimetering in existing telephone systems while requiring a minimum number of changes in the existing exchange. It comprises sensing whether the call duration counter is connected to the cord circuit or not, and employs the result of this sensing operation to control an inhibiting circuit which, respectively, passes or stops the local metering pulses on their way to the subscriber's call counter. The sensing should preferably have a low power demand, thus sensing of the potential should be sufficient. The principle may with some modifications also be used for toll multimetering. The first multimetering pulse will be suppressed.

BRIEF DESCRIPTION OF THE DRAWINGS

To obtain a clear and unambiguous view of this invention reference is made to the detailed description of preferred embodiments as shown in the accompanying drawings, in which.

DESCRIPTION OF PREFERRED EMBODIMENTS

Figure 1:
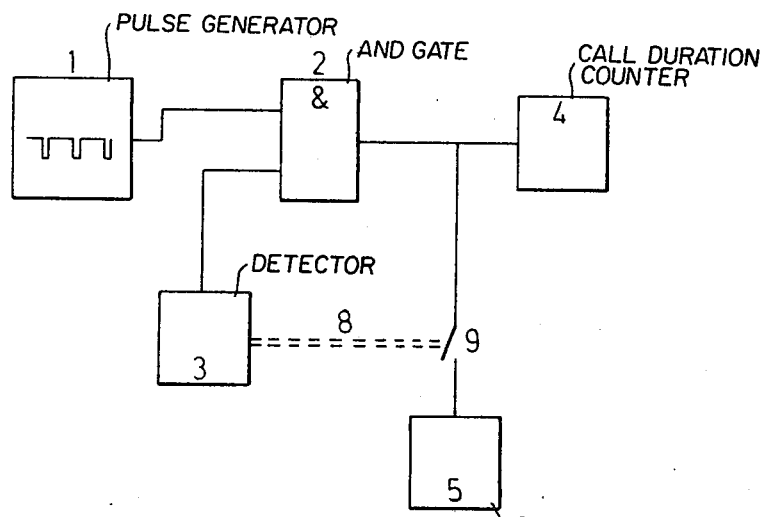
FIG. 1 illustrates a function diagram of a circuit according to this invention.

In FIG. 1, the numeral 1 represents a local multimetering pulse generator while 2 is an AND-gate. The block 3 is a detector which detects whether the cord circuit 5 and the call duration counter 4 are mutually connected or not. Reference number 4 is the call duration counter and 5 is the cord circuit. The double dotted line 8 represents a mechanical or electrical connection between the detector 3 and a switch 9 which make and break the connection between the call duration counter 4 and the cord circuit 5.

The operation of this circuit is rather simple. When the detector 3 detects that the connecting switch 9 really is closed and thus that a connection is established, the detector produces an output signal which enables the AND-gate 2. As long as a connection is established, the gate is then enabled and the clockpulses from the multimetering pulse generator 1 are led via the gate 2 to the counter 4 which is stepped forward by the received pulses.

This design is the most straight forward solution according to the invention. But it differs clearly from earlier known arrangements. It is commonly known to use an extra relay to obtain the desired connection between the pulse source and the counter. It is then, however, necessary to have either a mechanical connection between the connecting switch 9 and the detector 3, or a power consuming two wire electrical connection to the relay. With an embodiment according to this invention it is only necessary to sense the potential in the connection between the call duration counter 4 and the cord circuit 5. This potential changes when the switch 9 operates, and the changing potential is used to control the disabling/enabling of the gate 2. This connection requires a minimum of power.

In the most cases there will already exist a switch in the exchange, which switch operates when the cord circuit is connected/disconnected to/from the counter. Such a switch may then be used, and it is therefore only necessary to let the new arrangement for multimetering be connected to the existing exchange equipment via one single wire.

In a few types of exchanges the switch which connects the cord with the counter is not operated exactly at the moment when the call is established. Then the operating moment of this first switch cannot be used directly, and a second switch which operates at just the right moment has to be involved in the operating circuit. This may, however, also be a switch which already is present in the exchange and may or may not be used for other purposes. Such an arrangement will be described in more detail below in connection with further circuit descriptions.

Figure 2:
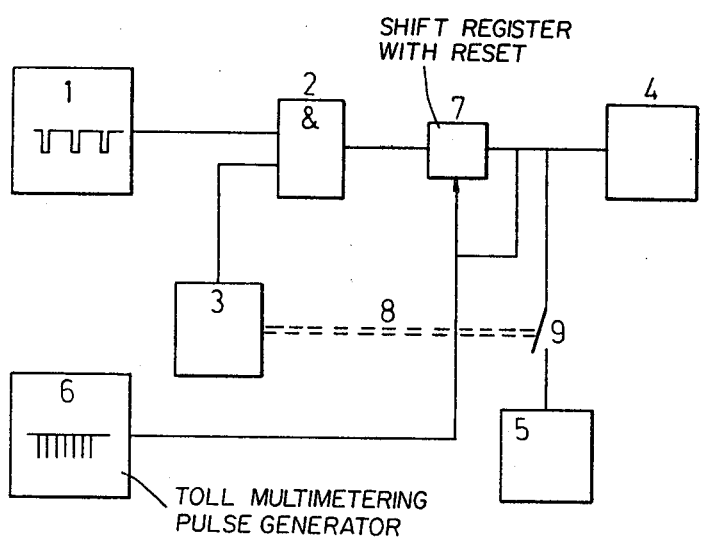
FIg. 2 shows a function diagram of a further embodiment.

In FIG. 2 the same reference numbers are used as in FIG. 1. In addition the following numbers are used. Reference number 6 represents a toll multimetering pulse generator circuit and 7 is a one step shift register with reset. The reset input is shown on the figure with an arrow.

The working operation of the arrangement of FIG. 2 is as follows:

The toll multimetering pulse generator 6 generates pulses at a much higher frequency than the local multimetering pulse generator 1. If the toll multimetering generator delivers pulses, these will be led directly to the counter 4 and will simultaneously reset the shift register 7. A local multimetering pulse generated in the generator 1 cannot pass through the one-step shift register 7 as long as this is regularly reset at a higher rate. This one-step shift register will also, when the toll multimetering pulses are not present, provide a suppression of the first of the local multimetering pulses as this will be delayed with one pulse period. The remaining parts of this circuit operate as described in connection with FIG. 1.

Figure 3:
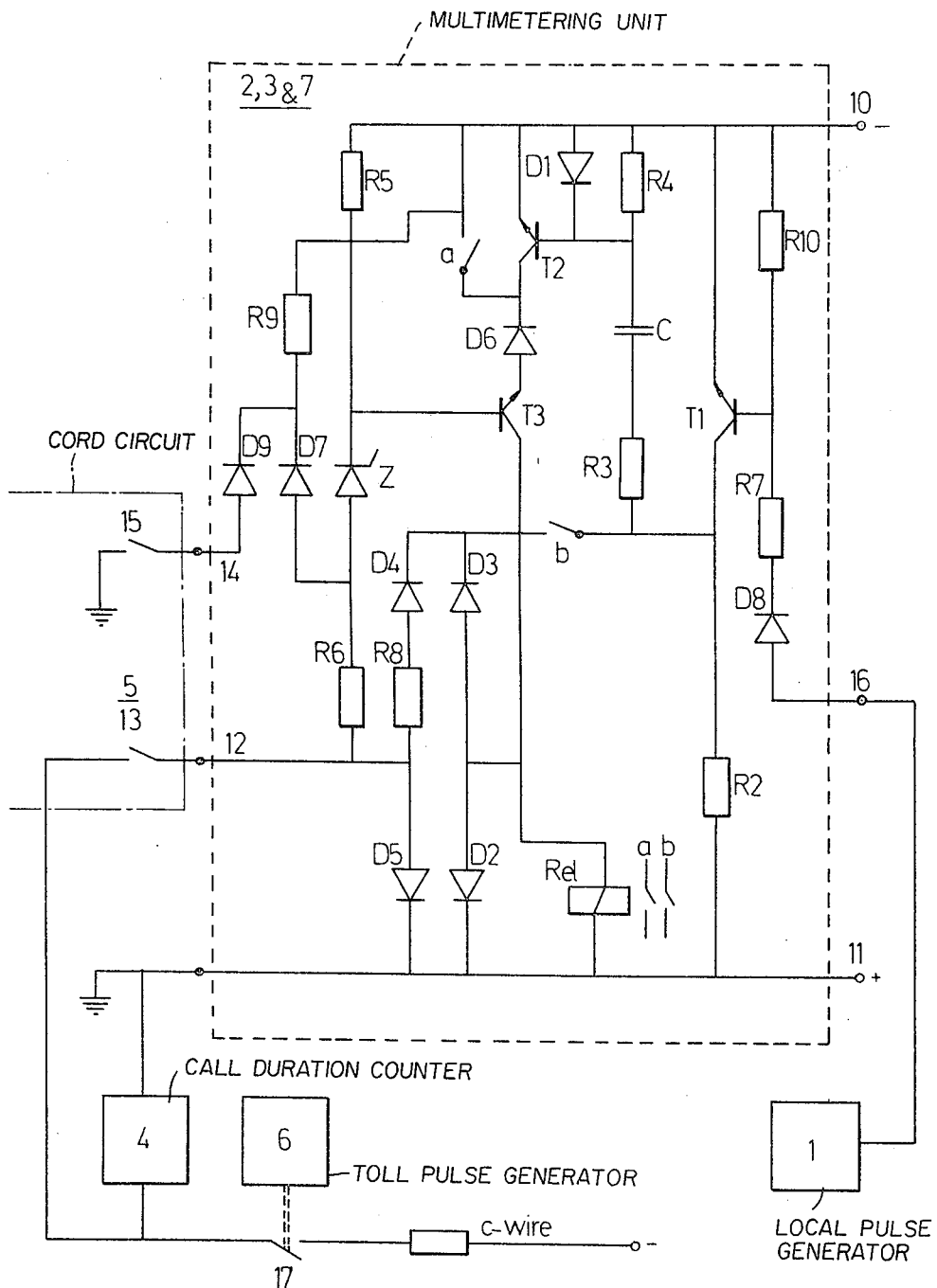
FIG. 3 shows a detailed diagram of a circuit which performs the desired functions.

FIG. 3 shows a detailed circuit arrangement according to FIG. 2.

In a practical arrangement two main types of cord circuits exist. In one, the counting is undertaken by means of earth pulses to the C-wire in the subscriber's set, and in the second case a battery pulse is delivered to the C-wire during the counting process. These two types of arrangement are, however, nearly identical in their operation and therefore only one will be described here.

The circuitry within the dotted rectangle represents the multimetering unit and corresponds to blocks 2, 3 and 7 in FIG. 2. The terminals 10 and 11 are connected to the battery and to earth respectively, terminal 12 is connected to a switch 13 which is closed when the cord circuit (5 in FIG. 1 and 2) is connected to the call duration counter 4 (FIG. 1 and 2) and terminal 14 (which only is used in circuits where switch 13 does close before the moment when the connection is established) is connected to a second switch 15 which operates at just the moment of connection establishment.

Terminal 16 is connected to the local multimetering pulse generator 1 (FIG. 1, 2). $T_1$, $T_2$ and $T_3$ represent three transistors, Rel is a relay which operates the switches $a$ and $b$.

When a called subscriber station B (not shown) replies to a call, the counter 4 (FIG. 1, 2) of the calling subscriber station A (not shown) is connected to the terminal 12 of the multimetering unit. The transistor $T_3$ thereby receives base current via resistor $R_6$ and the zener diode Z, and is switched to its conducting state. The multimetering generator 1 provides 150 msec. earth pulses to terminal 16 every 3rd minute, continuously. Between these pulses the transistor $T_1$ does not conduct, and the capacitor C is charged to 48V via $R_2$, $R_3$ and $R_4$. The transistor $T_2$, however, does not receive base current and therefore does not conduct, and thus the relay Rel remains not operated. The first earth pulse on terminal 16 gives transistor $T_1$ base current via diode $D_8$ and $R_7$ and it therefore becomes conducting. The capacitor C thereupon is discharged via $T_1$, $R_3$ and $D_1$. After 150 msec. the transistor $T_1$ ceases to conduct and the capacitor C is recharged to 48V via $R_2$, $R_3$ and the base-emitter circuit of transistor $T_2$ which becomes conducting. Now the relay Rel will operate and hold itself operated over its working contact $a$. In this manner suppression of the first counting pulse is obtained.

The contact $b$ now is closed, and the next generator pulse will therefore via transistor $T_1$, diode $D_4$, resistor $P_8$ and terminal 12, send a multimetering pulse on the C-wire and thereby operate the calling A subscriber's counter.

In such cases where terminal 12 via switch 13 is connected to the counter of the calling subscriber station A at a moment different from the moment at which subscriber A makes a reply, the circuit has to be completed by the components $D_9$ and $D_7$. $D_7$ absorbs the current passing through $R_6$ and thus insures that transistor $T_3$ does not receive base current until switch 15 operates. The switch 15 operates when the called subscriber B replies, and remains operated during the call.

The conditions which have to be satisfied to obtain multimetering are:

1. The counter 4 is connected to terminal 12.
2. Switch 15 is operated (in this case $D_9$ and $D_7$ have to be included).
3. Rel has to be operated when the multimetering pulse arrives.

During toll multimetering the switch 17 operates periodically. Each time when the switch MM is closed the potential on terminal 12 will rise so much that the zener diode Z will no longer be conducting, transistor $T_3$ is switched off and the relay Rel is released. The next local metering pulse on terminal 16 will therefore not be led to the counter 4, but will only operate the relay Rel.

Components not mentioned above have the following functions:

Diode $D_3$ holds relay Rel activated while a counting pulse is transmitted.

Diode $D_4$ inhibits external metering pulses from having any influence on relay Rel.

Diode $D_8$ disables the circuit if the current supply fails.

Diodes $D_2$, $D_5$, $D_4$, $D_6$ are also protecting diodes.

The resistors $R_4$, $R_5$, $R_{10}$ are leak current decoupling resistors.

The described circuit is only to be taken as an embodiment of the circuit according to the invention.

Many other solutions and arrangements may be included within the scope of this invention as set forth in the claims below.

The relay Rel may, e.g., be replaced by an electronic circuit having the same functions and a great part of the circuit may be designed as an integrated chip. As far as the function of the circuit is the same as described in one or more of the claims below, the circuit thus is within the scope of this invention.

I claim:

1. A multimetering method adaptable to existing telecommunication switching systems in which the establishment of a connection between a calling subscriber and a called subscriber is effected at least partly via a cord circuit and where the calling subscriber is allocated a call duration counter which is arranged to be stepped forward by periodic metering signals generated by a metering signal generator, characterized in that the metering signals, which are common for all subscribers, are continuously led to an inhibiting circuit for each subscriber which in dependence on whether his call duration counter is connected to the cord circuit or not, respectively feeds the metering signals further towards his call duration counter or stops these signals.

2. A multimetering method according to claim 1 for use in connection with a telephone switching system in which multimetering of toll connections is undertaken by conventional toll multimetering equipment, characterized in that said periodic metering signals represent local multimetering and that the feeding of the call duration counter with said local multimetering signals is also inhibited if toll multimetering signals are applied, the toll multimetering signals being by-passed directly to the calling subscribers counter.

3. A multimetering method according to claim 2, in which the first local multimetering pulse is suppressed by leading the output from the inhibiting circuit to a resetable one-step shift register and that each toll multimetering pulse, when present, resets this shift register.

4. A multimetering circuit to perform the method according to claim 3, in which the winding of a relay and the emitter/collector circuits of a first and a second transistor are connected in series between the battery and earth potential, that when the called subscriber replies to a call, the calling subscriber's call duration counter is connected to the cord circuit via a contact in the cord circuit, whereby the earth (or battery) potential via the same contact is applied to the base of the second transistor making it conductive, the pulses from a clock pulse generator via a firstpulse suppressing circuit are led to the base of the first transistor making it conductive from the trailing edge of the first received clock pulse, thus operating the relay, and that the relay operating two relay contacts the first of which by-passes the first transistor and the second of which connects the clock pulse generator to the calling subscriber call counter.

5. A multimetering circuit according to claim 2, in which the toll multimetering pulses, when present, are applied via a contact in the cord circuit and that these pulses, via a threshold circuit, switch a transistor to its non-conductive state, thus inhibiting the operation of the local multimetering process, and that these pulses are also led directly to the call duration counter.

6. A multimetering circuit according to claim 5, in which the contact in the cord circuit does not close at the moment when the called subscriber replies, and a second cord circuit contact which closes just at the above described moment is used to drive the transistor to its conductive state.

7. A multimetering circuit according to claim 1, in which the potential of the connection between the call duration counter and the cord circuit is sensed substantially without power consumption and the sensed potential is used to control the inhibiting circuit.

* * * * *